(12) United States Patent
Guo et al.

(10) Patent No.: US 12,267,174 B2
(45) Date of Patent: Apr. 1, 2025

(54) UNIFIED FEEDBACK FOR CONFIGURED GRANT FOR ULTRA RELIABLE COMMUNICATION AND UNLICENSED SPECTRUM

(71) Applicant: QUALCOMM Incorporated, San Diego, CA (US)

(72) Inventors: Shaozhen Guo, Beijing (CN); Xiaoxia Zhang, San Diego, CA (US); Changlong Xu, Beijing (CN); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 18/003,640

(22) PCT Filed: Aug. 14, 2020

(86) PCT No.: PCT/CN2020/109096
§ 371 (c)(1),
(2) Date: Dec. 28, 2022

(87) PCT Pub. No.: WO2022/032616
PCT Pub. Date: Feb. 17, 2022

(65) Prior Publication Data
US 2023/0344561 A1  Oct. 26, 2023

(51) Int. Cl.
*H04L 1/00* (2006.01)
*H04L 1/1822* (2023.01)
(Continued)

(52) U.S. Cl.
CPC ............ *H04L 1/1822* (2013.01); *H04L 1/188* (2013.01); *H04L 1/189* (2013.01); *H04W 72/23* (2023.01)

(58) Field of Classification Search
CPC ....... H04L 1/1822; H04L 1/188; H04L 1/189; H04W 72/23
See application file for complete search history.

(56) References Cited

U.S. PATENT DOCUMENTS

| 10,368,372 B2 | 7/2019 | Chendamarai Kannan et al. |
| 11,228,990 B2 * | 1/2022 | Jeon ...................... H04W 52/50 |

(Continued)

FOREIGN PATENT DOCUMENTS

| CN | 107211311 A | 9/2017 |
| WO | WO-2017123769 | 7/2017 |

OTHER PUBLICATIONS

Huawei, et al., "Remaining Issues on Configured Grant," 3GPP TSG-RAN WG2 Meeting #109 electronic, R2-2001033, Feb. 24-Mar. 6, 2020, (Mar. 6, 2020), the whole document, 5 pages.

(Continued)

*Primary Examiner* — Esaw T Abraham
(74) *Attorney, Agent, or Firm* — Harrity & Harrity, LLP

(57) ABSTRACT

Various aspects of the present disclosure generally relate to wireless communication. In some aspects, a user equipment (UE) may start a timer after transmitting an uplink communication on a physical uplink shared channel to a base station using a configured grant. The UE may determine whether the uplink communication is acknowledged as received by the base station based at least in part on determining whether a downlink communication from the base station is detected within a time duration associated with the timer. Numerous other aspects are provided.

29 Claims, 17 Drawing Sheets

(51) Int. Cl.
    *H04L 1/1867*      (2023.01)
    *H04W 72/23*      (2023.01)

(56) References Cited

U.S. PATENT DOCUMENTS

| | | | | |
|---|---|---|---|---|
| 11,272,539 | B2 * | 3/2022 | Babaei | H04W 74/0866 |
| 11,432,320 | B2 * | 8/2022 | Kunt | H04L 5/0055 |
| 11,677,514 | B2 * | 6/2023 | Wu | H04L 1/1822 |
| | | | | 370/329 |
| 11,985,706 | B2 * | 5/2024 | Jeon | H04W 74/0833 |
| 12,022,508 | B2 * | 6/2024 | Wu | H04W 74/0808 |
| 2018/0294940 | A1 | 10/2018 | Lee et al. | |

OTHER PUBLICATIONS

International Search Report and Written Opinion—PCT/CN2020/109096—ISA/EPO—May 12, 2021.
Spreadtrum Communications: "Autonomous Uplink Transmission in NR-U," 3GPP TSG-RAN WG2 Meeting #103bis, R2-1813875, Oct. 8-12, 2018 (Oct. 12, 2018), 4 pages, the whole document.

\* cited by examiner

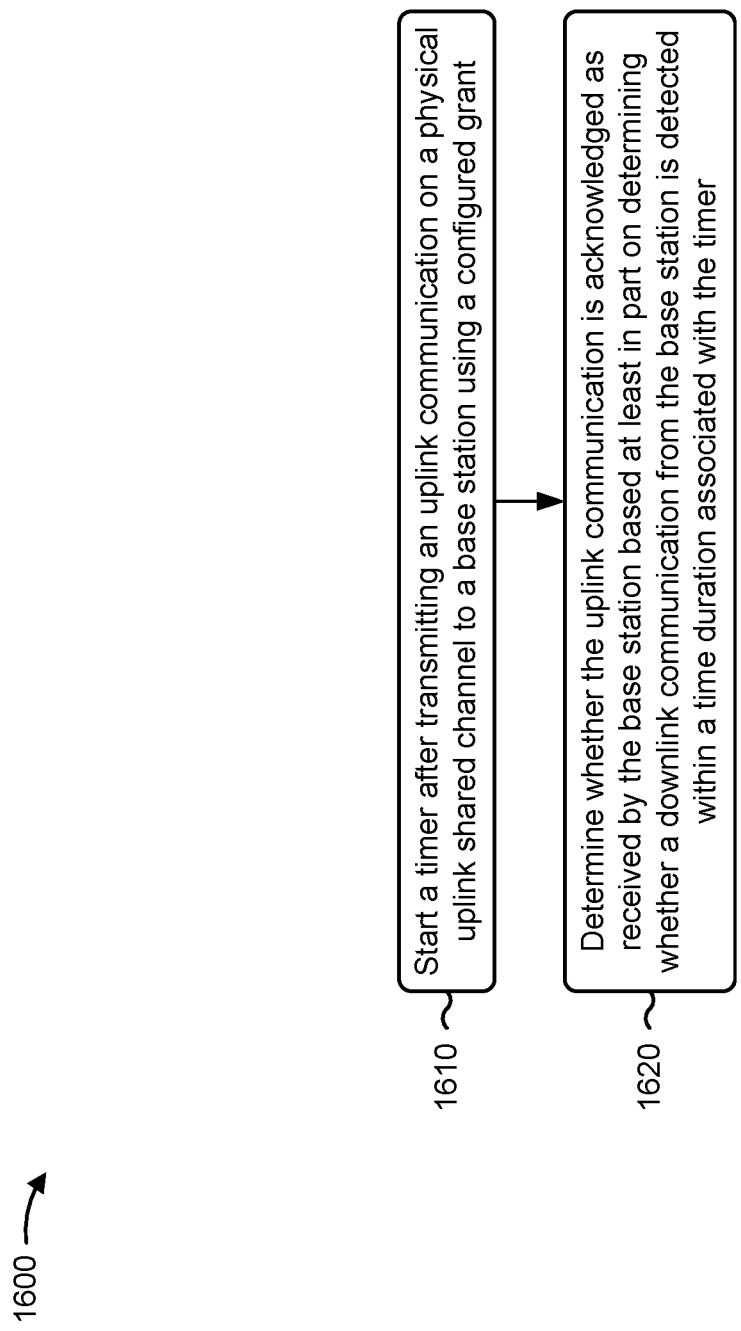

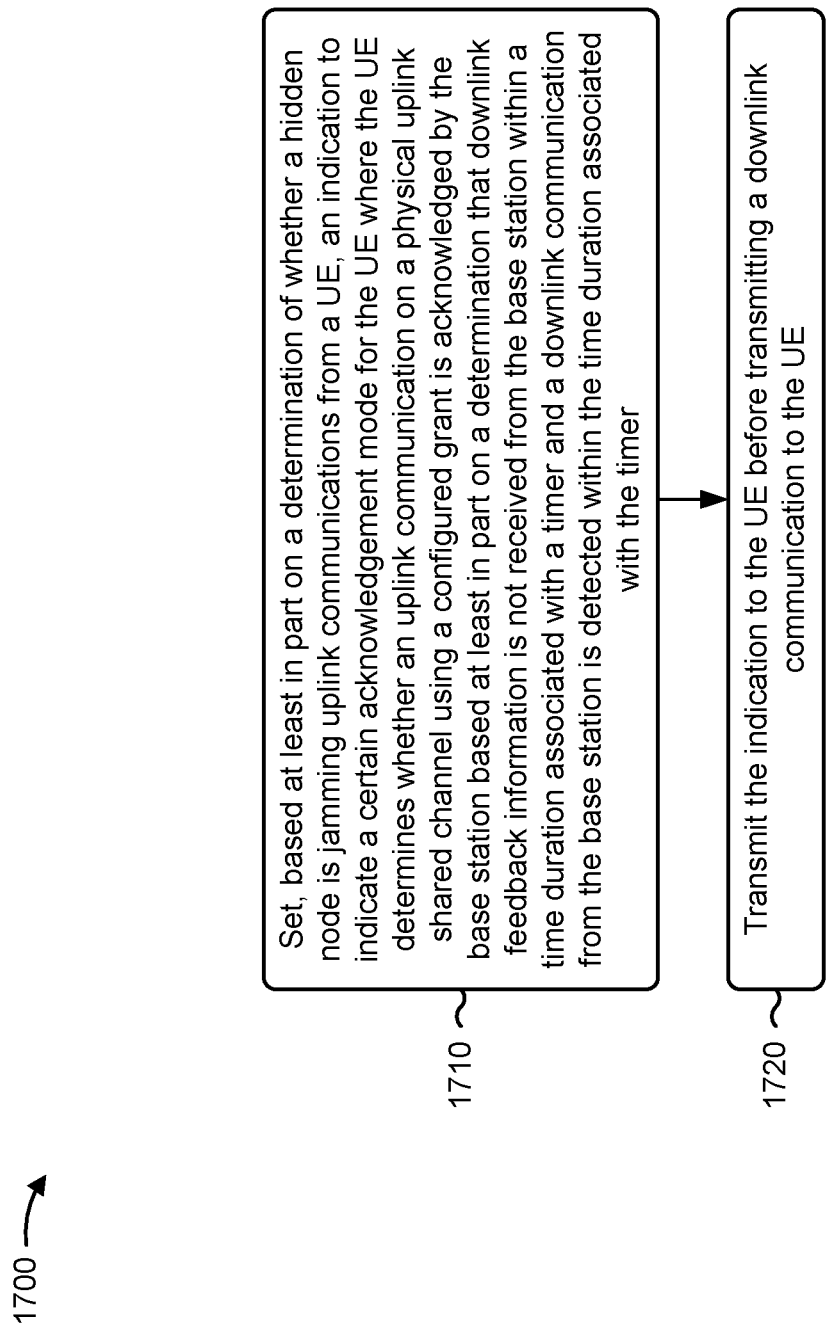

UNIFIED FEEDBACK FOR CONFIGURED GRANT FOR ULTRA RELIABLE COMMUNICATION AND UNLICENSED SPECTRUM

CROSS-REFERENCE TO RELATED APPLICATION

This Patent Application is a 371 national stage of PCT Application No. PCT/CN2020/109096 filed on Aug. 14, 2020, entitled "UNIFIED FEEDBACK FOR CONFIGURED GRANT FOR ULTRA RELIABLE COMMUNICATION AND UNLICENSED SPECTRUM," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for unified feedback for configured grant for ultra-reliable communication and unlicensed spectrum.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes starting a timer after transmitting an uplink communication on a physical uplink shared channel to a base station using a configured grant, and determining whether the uplink communication is acknowledged as received by the base station based at least in part on determining whether a downlink communication from the base station is detected within a time duration associated with the timer.

In some aspects, a method of wireless communication performed by a base station includes setting, based at least in part on a determination of whether a hidden node is jamming uplink communications from a UE, an indication to indicate a certain acknowledgement mode for the UE where the UE determines whether an uplink communication on a physical uplink shared channel using a configured grant is acknowledged by the base station based at least in part on a determination that downlink feedback information is not received from the base station within a time duration associated with a timer and a downlink communication from the base station is detected within the time duration associated with the timer. The method includes transmitting the indication to the UE before transmitting a downlink communication to the UE.

In some aspects, a UE for wireless communication includes a memory and one or more processors operatively coupled to the memory, the memory and the one or more processors configured to start a timer after transmitting an uplink communication on a physical uplink shared channel to a base station using a configured grant, and determine whether the uplink communication is acknowledged as received by the base station based at least in part on determining whether a downlink communication from the base station is detected within a time duration associated with the timer.

In some aspects, a base station for wireless communication includes a memory and one or more processors operatively coupled to the memory, the memory and the one or more processors configured to set, based at least in part on a determination of whether a hidden node is jamming uplink communications from a UE, an indication to indicate a certain acknowledgement mode for the UE where the UE determines whether an uplink communication on a physical uplink shared channel using a configured grant is acknowledged by the base station based at least in part on a determination that downlink feedback information is not received from the base station within a time duration associated with a timer and a downlink communication from the base station is detected within the time duration associated with the timer. The memory and the one or more processors are configured to transmit the indication to the UE before transmitting a downlink communication to the UE.

In some aspects, a non-transitory computer-readable medium storing a set of instructions for wireless communication includes one or more instructions that, when executed by one or more processors of a UE, cause the UE to start a timer after transmitting an uplink communication on a physical uplink shared channel to a base station using a configured grant, and determine whether the uplink communication is acknowledged as received by the base station based at least in part on determining whether a downlink communication from the base station is detected within a time duration associated with the timer.

In some aspects, a non-transitory computer-readable medium storing a set of instructions for wireless communication includes one or more instructions that, when executed by one or more processors of a base station, cause the base station to set, based at least in part on a determination of whether a hidden node is jamming uplink communications from UE, an indication to indicate a certain acknowledgement mode for the UE where the UE determines whether an uplink communication on a physical uplink shared channel using a configured grant is acknowledged by the base station based at least in part on a determination that downlink feedback information is not received from the base station within a time duration associated with a timer and a downlink communication from the base station is detected within the time duration associated with the timer, and transmit the indication to the UE before transmitting a downlink communication to the UE.

In some aspects, an apparatus for wireless communication includes means for starting a timer after transmitting an uplink communication on a physical uplink shared channel to a base station using a configured grant, and means for determining whether the uplink communication is acknowledged as received by the base station based at least in part on determining whether a downlink communication from the base station is detected within a time duration associated with the timer.

In some aspects, an apparatus for wireless communication includes means for setting, based at least in part on a determination of whether a hidden node is jamming uplink communications from a UE, an indication to indicate a certain acknowledgement mode for the UE where the UE determines whether an uplink communication on a physical uplink shared channel using a configured grant is acknowledged by the apparatus based at least in part on a determination that downlink feedback information is not received from the apparatus within a time duration associated with a timer and a downlink communication from the apparatus is detected within the time duration associated with the timer, and means for transmitting the indication to the UE before transmitting a downlink communication to the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 16 is a diagram illustrating an example process performed, for example, by a UE, in accordance with various aspects of the present disclosure.

FIG. 17 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
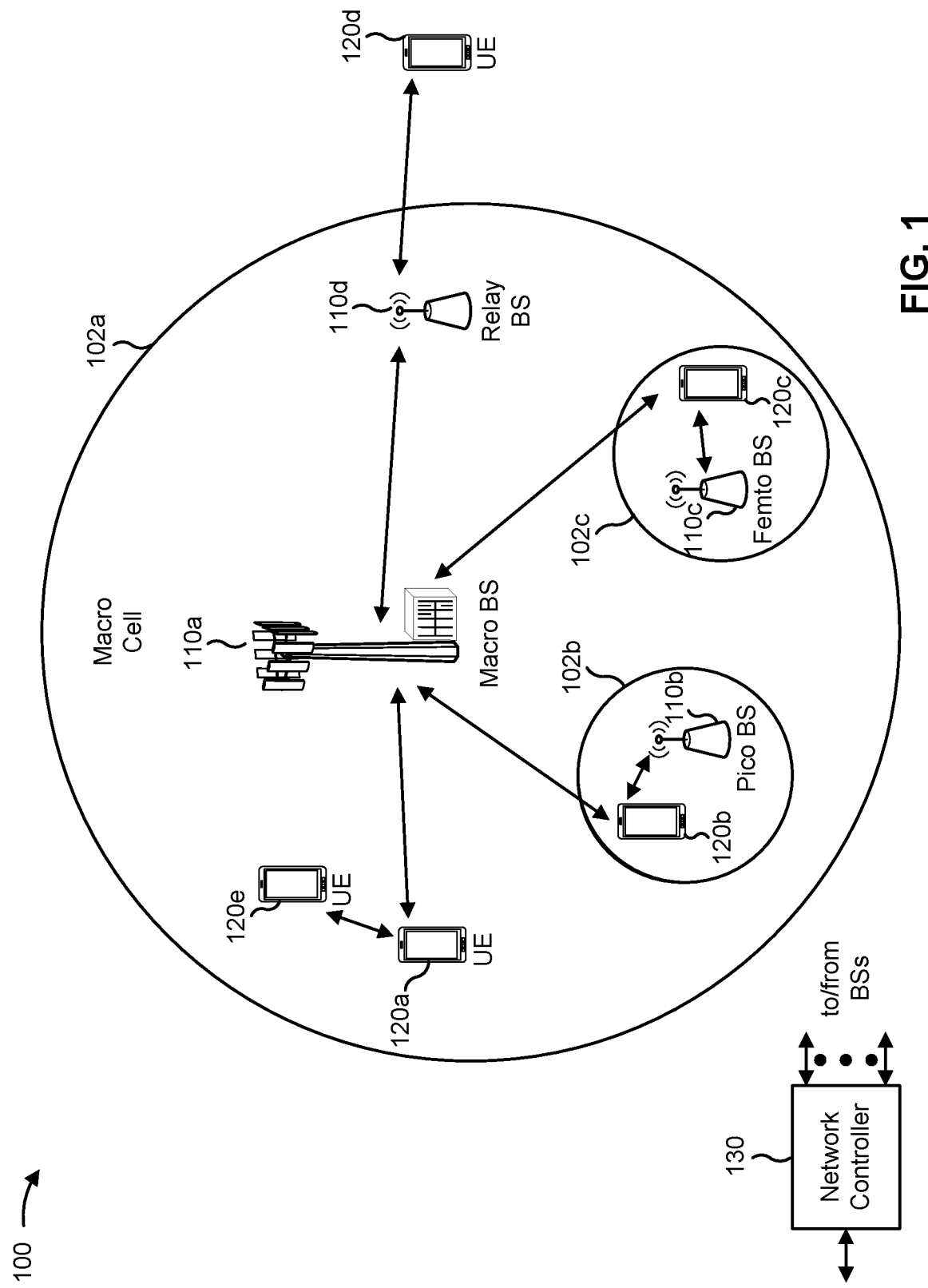
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
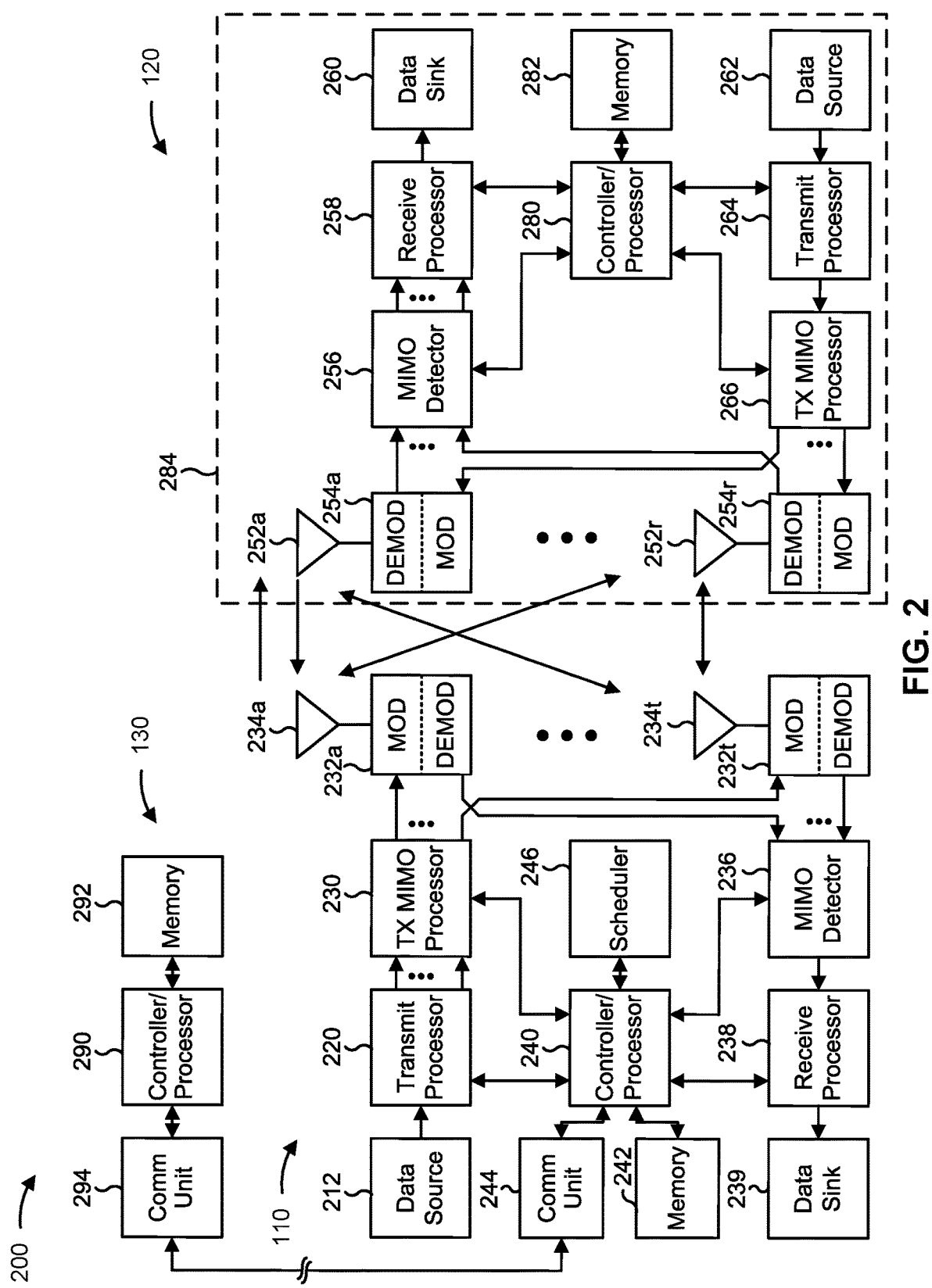
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-17.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-17.

Controller/processor 240 of base station 110, controller/processor 280 of UE 120, and/or any other component(s) of FIG. 2 may perform one or more techniques associated with unified feedback for configured grant for ultra-reliable communication and unlicensed spectrum, as described in more detail elsewhere herein. For example, controller/processor 240 of base station 110, controller/processor 280 of UE 120, and/or any other component(s) of FIG. 2 may perform or direct operations of, for example, process 1600 of FIG. 16, process 1700 of FIG. 17, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 1600 of FIG. 16, process 1700 of FIG. 17, and/or other processes as described herein. In some aspects, executing instructions may include running the instructions, converting the instructions, compiling the instructions, interpreting the instructions, and/or the like.

In some aspects, UE 120 may include means for starting a timer after transmitting an uplink communication on a physical uplink shared channel to a base station using a configured grant, means for determining whether the uplink communication is acknowledged as received by the base station based at least in part on determining whether a downlink communication from the base station is detected within a time duration associated with the timer, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for setting, based at least in part on a determination of whether a hidden node is jamming uplink communications from a UE, an indication to indicate a certain acknowledgement mode for the UE where the UE determines whether an uplink communication on a physical uplink shared channel using a configured grant is acknowledged by the apparatus based at least in part on a determination that downlink feedback information is not received from the apparatus within a time duration associated with a timer and a downlink communication from the apparatus is detected within the time duration associated with the timer, means for transmitting the indication to the UE before transmitting a downlink communication to the UE, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

For scheduling-based (grant-based) uplink transmission, a UE transmits a scheduling request and then waits to receive an uplink grant from a base station (e.g., gNB) before transmitting an uplink communication. Transmitting the request and waiting for the uplink grant takes time and makes it difficult to meet shorter latency requirements for ultra-reliable low-latency communication (URLLC). Grant-free (configured grant) uplink transmission allows the gNB to configure periodic uplink resources for a UE. Therefore, if the UE has data, the UE may transmit the data on the configured resources without obtaining a dynamic uplink grant from the gNB.

Figure 3:
FIG. 3 is a diagram illustrating an example of uplink transmission for URLLC, in accordance with various aspects of the present disclosure.

FIG. 3 is a diagram illustrating an example 300 of uplink transmission for URLLC, in accordance with various aspects of the present disclosure.

URLLC may use hybrid automatic repeat request (HARQ) for uplink transmissions, to inform a UE if an uplink transmission is received by a gNB. Normally, HARQ may involve transmitting an acknowledgement (ACK) if an uplink transmission is received and transmitting a negative acknowledgement (NACK) if an uplink transmission is not received or is not properly decoded. For URLLC, the UE may not necessarily receive an ACK from the gNB but may assume ACK. For example, example 300 shows that a gNB may transmit a dynamic uplink grant for retransmission of an uplink communication (transport block) from the UE. The retransmission may be associated with a HARQ process. The UE may use a configured grant timer (e.g., configuredGrantTimer) that starts after an uplink communication is transmitted and restarts after the dynamic uplink grant is received. Rather than receiving an ACK for the retransmission of the uplink communication, the UE may assume ACK upon expiration of the configured grant timer (if no NACK is received). As shown in example 300, no uplink (UL) grant is received from the gNB during a time duration that is associated with the configured grant timer.

As indicated above, FIG. 3 is provided as an example. Other examples may differ from what is described with regard to FIG. 3.

Figure 4:
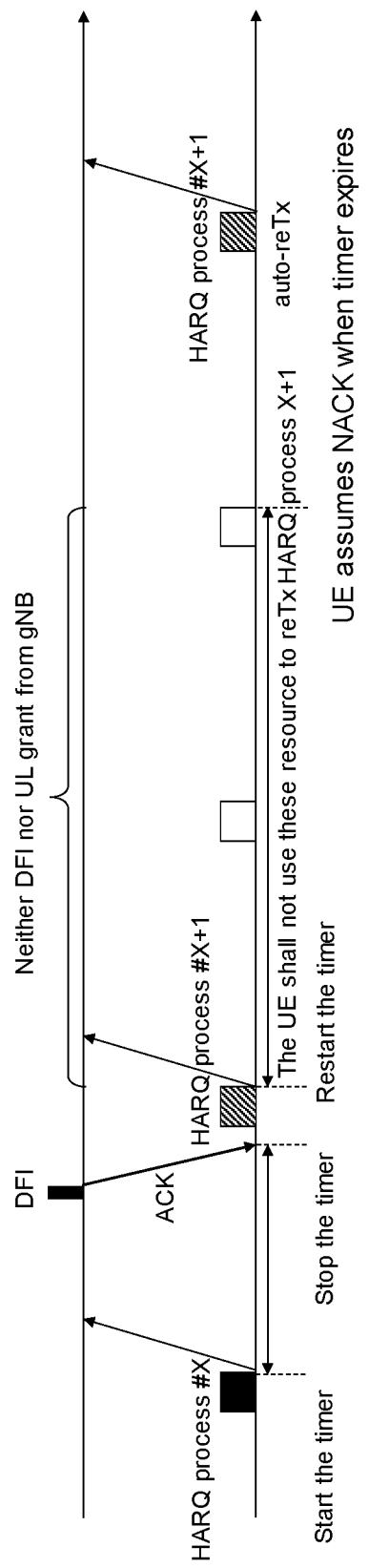
FIG. 4 is a diagram illustrating an example of uplink transmission for new radio unlicensed spectrum, in accordance with various aspects of the present disclosure.

FIG. 4 is a diagram illustrating an example 400 of uplink transmission for new radio unlicensed spectrum (NR-U), in accordance with various aspects of the present disclosure.

Configured grant may also be used for NR-U, which may also use a HARQ process for uplink transmissions. A UE may not necessarily receive an ACK or NACK from a gNB but may assume NACK. For example, example 400 shows that a gNB may transmit dynamic feedback information (DFI) in association with receiving an uplink communication associated with HARQ process X. The UE may transmit another uplink communication as part of a next HARQ process if DFI indicates ACK for HARQ process X. The UE may use a configured grant retransmission timer (e.g., cg-RetransmissionTimer) that starts after an uplink communication associated with HARQ process X is transmitted and stops after the DFI is received. The timer may restart after the UE transmits another uplink communication associated with HARQ process X+1. If no DFI or uplink grant for the HARQ process X+1 is received from the gNB during a time duration that is associated with the configured grant retransmission timer, the UE may assume NACK upon expiration of the configured grant retransmission timer.

As indicated above, FIG. 4 is provided as an example. Other examples may differ from what is described with regard to FIG. 4.

There may be little harmony between a HARQ procedure for uplink configured grant for URLLC and a HARQ procedure for uplink configured grant for NR-U. For URLLC in a licensed band, a UE may assume an ACK when no downlink communication is received from a gNB. For URLLC operation in NR-U, ACK may not be assumed from no downlink communication from the gNB. For example, if the UE sends a configured grant uplink communication but the gNB fails to detect the uplink communication, the gNB may have intended to transmit a NACK but failed to transmit the NACK due to a listen before talk failure. In this scenario, if the UE assumes that no downlink communication from the gNB means ACK, then the UE may misinterpret an intended NACK as an ACK. For NR-U, the UE assumes a NACK when DFI is not received from the gNB. If the gNB decodes a physical uplink shared channel (PUSCH) correctly, the gNB may need to successfully transmit DFI within a retransmission timer, or else the UE may interpret no DFI as a NACK instead of an intended ACK. Without a harmonization of HARQ procedures for URLLC and NR-U, the UE and the gNB may misinterpret a lack of a downlink communication from the base station as an ACK or NACK. Misinterpreting HARQ feedback may degrade communications and/or cause the UE and the gNB to waste time, power, processing resources, or signaling resources due to retransmissions to account for degraded communications or due to retransmissions that are unnecessary.

According to various aspects described herein, a UE may start a time after transmitting an uplink communication on a PUSCH to a base station (e.g., gNB) using a configured grant from the gNB. The UE may determine whether the uplink communication is acknowledged by the gNB based at least in part on whether a downlink communication from the gNB is detected within a time duration that is associated with the timer. For example, the UE may determine that the uplink communication is acknowledged (ACK) if DFI is not received from the gNB within the time duration associated with the timer but a downlink communication from the base station is detected within the time duration. In some aspects, the UE may determine that the uplink communication is negative acknowledged (NACK) if DFI is not received from the gNB within the time duration associated with the timer and a downlink communication from the base station is not detected within the time duration. In this way, whether the configured grant is for URLLC or for NR-U, the UE may accurately determine whether the uplink communication is received and decoded by the gNB. As a result, the UE and the gNB conserve time, power, processing resources, or signaling resources that would otherwise be consumed for retransmissions to account for degraded communications or for retransmissions that are unnecessary.

Figure 5:
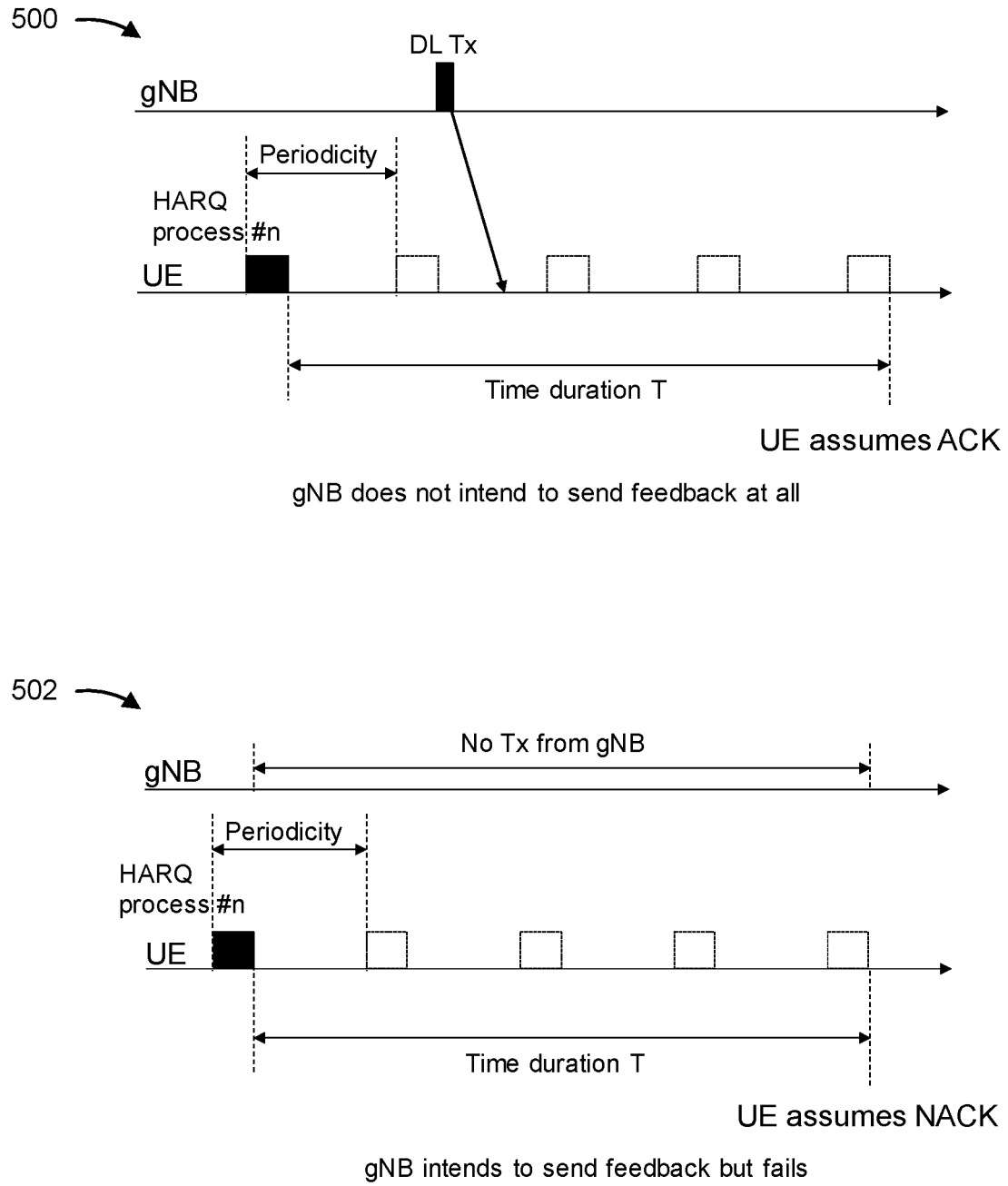
FIG. 5 is a diagram illustrating examples of unified feedback for configured grant for ultra-reliable communication and unlicensed spectrum, in accordance with various aspects of the present disclosure.

FIG. 5 is a diagram illustrating examples 500, 502 of unified feedback for configured grant for ultra-reliable communication and unlicensed spectrum, in accordance with various aspects of the present disclosure.

Example 500 in FIG. 5 shows a time duration T for a timer that starts after an uplink communication is transmitted. The uplink communication may use a configured grant with a given periodicity. The uplink communication may be associated with a HARQ process (e.g., HARQ process #0). If the UE receives a downlink (DL) communication during the time duration, the UE may interpret such downlink activity as an ACK. This process may be rather immune to whether the gNB intended to send feedback or failed to send feedback in the interim.

Example 502 shows an example where no downlink communication is received from the gNB during the time duration. The UE may interpret no downlink activity during the time duration as a NACK. This process may account for situations where the gNB intended to send feedback but failed to send the feedback for one reason or another.

As indicated above, FIG. 5 provides some examples. Other examples may differ from what is described with regard to FIG. 5.

Figure 6:
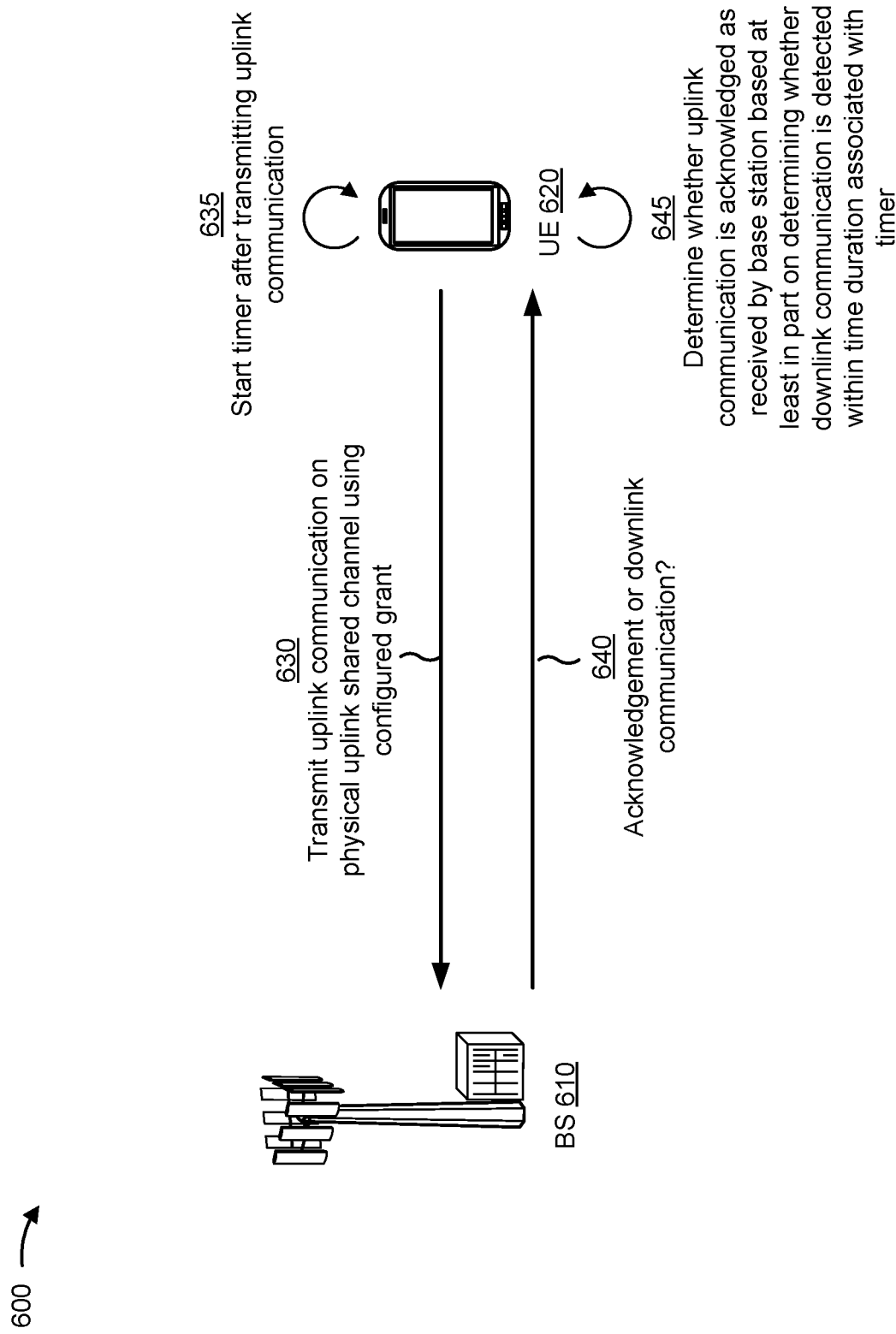
FIG. 6 is a diagram illustrating an example of unified feedback for configured grant for ultra-reliable communication and unlicensed spectrum, in accordance with various aspects of the present disclosure.

FIG. 6 is a diagram illustrating an example 600 of unified feedback for configured grant for ultra-reliable communication and unlicensed spectrum, in accordance with various aspects of the present disclosure. As shown in FIG. 6, example 600 includes communication between BS 610 (e.g., a BS 110 depicted in FIGS. 1 and 2) and a UE 620 (e.g., a UE 120 depicted in FIGS. 1 and 2). In some aspects, BS 610 and UE 620 may be included in a wireless network, such as wireless network 100. BS 610 and UE 620 may communicate on a wireless access link, which may include an uplink and a downlink.

BS 610 may provide UE 620 with configured grants that occur at a regular periodicity. As shown by reference number 630, UE 620 may transmit an uplink communication on a PUSCH using a configured grant. The uplink communication may be associated with a HARQ process, and UE 620 may intend to determine whether the uplink communication is received by BS 610 as part of a certain acknowledgement mode that differs from existing HARQ procedures. Accordingly, UE 620 may start a timer after transmitting the uplink communication, as shown by reference number 635. In some aspects, the timer may be a new timer. In some aspects, UE 620 may use or reuse an existing configured grant retransmission timer (e.g., cg-Retransmission Timer in NR-U).

BS 610 may transmit a downlink communication after BS 610 correctly decodes the uplink communication on the PUSCH. As shown by reference number 640, BS 610 may (or may not) transmit an ACK or NACK for the uplink communication. BS 610 may (or may not) transmit a downlink communication without successfully transmitting or intending to transmit an ACK or NACK. As shown by reference number 645, UE 620 may determine whether the uplink communication is ACK or NACK based at least in part on whether a downlink communication is detected within a time duration associated with the timer (e.g., while the timer is running and before expiration of the timer). If a DFI is not received but downlink activity is detected (e.g., downlink communication received) during the time duration, UE 620 determines that the uplink communication was successfully received and decoded by BS 610 (e.g., ACK). If a DFI is not received and no other downlink activity is detected during the timer duration, UE 620 determines that the uplink communication was unsuccessfully received and/or decoded by BS 610 (e.g., NACK). UE 620 may retransmit the uplink communication or transmit another uplink communication at a next configured grant as appropriate.

In some aspects, UE 620 may receive an ACK or NACK during the time duration, and this may supersede any assumptions that are to be made during the time duration. In any event, UE 620 may use a configured grant in URLLC or NR-U, and UE 620 may operate with more certainty in how to determine if an uplink communication is received, whether the configured grant is in URLLC or NR-U.

As indicated above, FIG. 6 is provided as an example. Other examples may differ from what is described with regard to FIG. 6.

Figure 7:
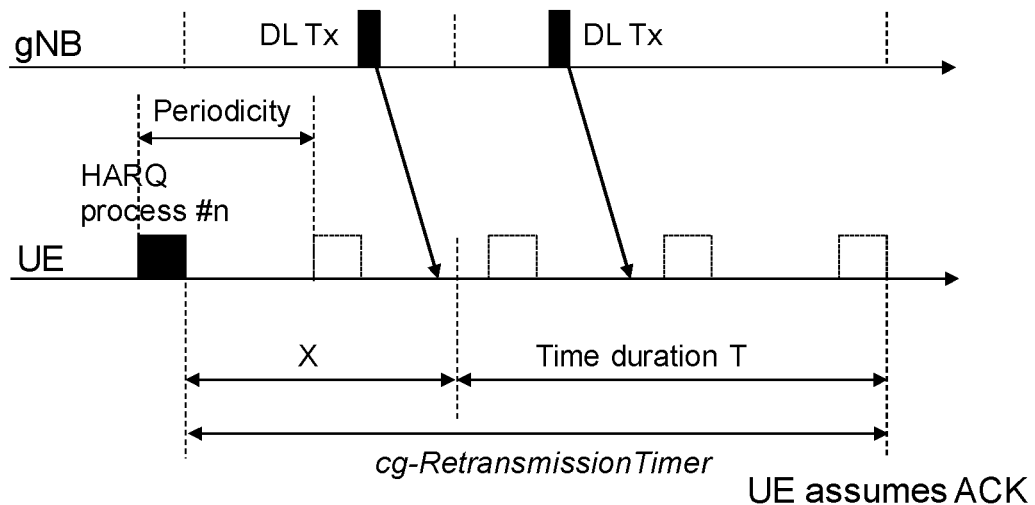
FIG. 7 is a diagram illustrating an example of unified feedback for configured grant for ultra-reliable communication and unlicensed spectrum, in accordance with various aspects of the present disclosure.
Figure 7:
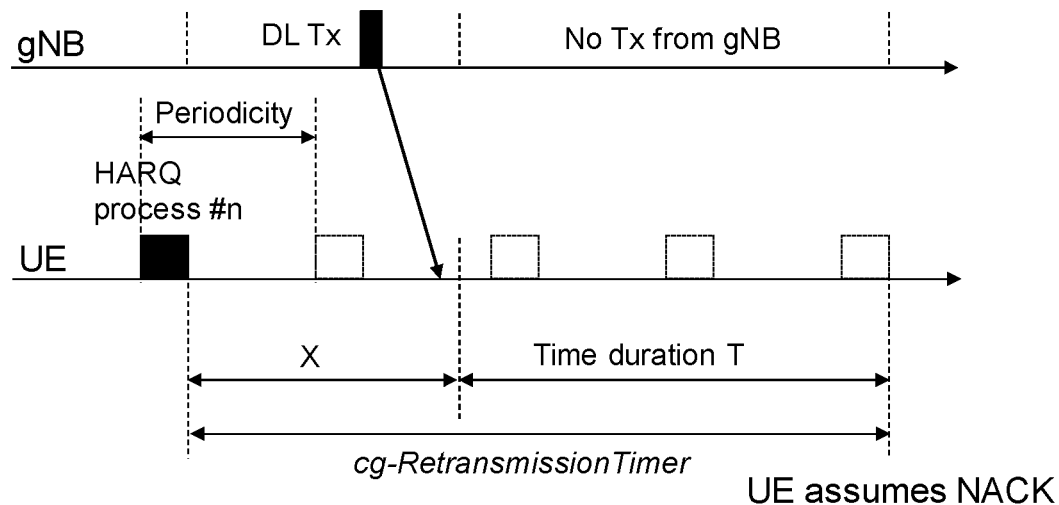

FIG. 7 is a diagram illustrating an example 700 of unified feedback for configured grant for ultra-reliable communication and unlicensed spectrum, in accordance with various aspects of the present disclosure.

In some aspects, a relevant time duration for a UE to detect downlink activity from a gNB may start later so as to ensure that a downlink transmission starts after the gNB is given time to correctly decode an uplink communication on a PUSCH. Example 700 in FIG. 7 shows that a time duration associated with a timer, which starts after an uplink communication is transmitted, may include two (or more) parts. A first duration (shown as X) may be a minimum time duration that is necessary to ensure that the gNB is given time to decode the uplink communication successfully. The first duration may use a time duration of an existing minimum delay timer, such as cg-minDFI-Delay. The first duration may also be another time duration that is configured via a radio resource control message. The second duration may be a time duration T during which the UE detects or does not detect downlink activity from the gNB in order to determine whether the uplink communication is acknowledged by the gNB. For example, example 700 shows a downlink transmission that is received but not yet fully decoded within the first duration (shown as "X" in example 700), and may eventually be decoded successfully. Because downlink activity is detected during the second duration (shown as "Time duration T" in example 700), the UE may assume an ACK for the uplink communication. The downlink transmission received during the first duration may not be related to the gNB successfully decoding the uplink communication, given the short amount of time between transmission of the uplink communication and reception of the downlink communication in the first duration.

Example 702 shows that while a downlink communication is received during the first duration, no downlink activity is detected from the gNB during the second duration. Accordingly, the UE may assume a NACK for the uplink communication.

As indicated above, FIG. 7 is provided as an example. Other examples may differ from what is described with regard to FIG. 7.

Figure 8:
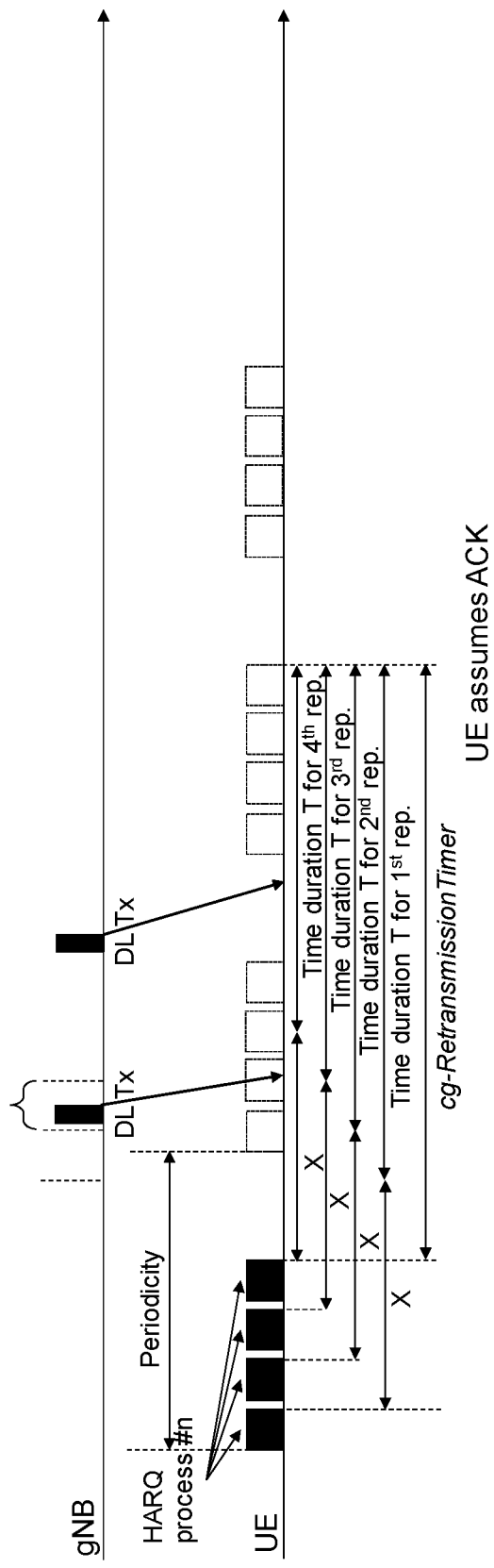
FIG. 8 is a diagram illustrating an example of unified feedback for configured grant for ultra-reliable communication and unlicensed spectrum, in accordance with various aspects of the present disclosure.

FIG. 8 is a diagram illustrating an example 800 of unified feedback for configured grant for ultra-reliable communication and unlicensed spectrum, in accordance with various aspects of the present disclosure.

In some aspects, to assume an ACK, the downlink communication may need to be received a threshold quantity of symbols (which represents a threshold amount of time) from when the uplink communication is transmitted. The threshold quantity may be configured so as to account for a time for the uplink communication to be received and successfully decoded before the gNB transmits the downlink communication. The threshold quantity may vary depending on a distance between the UE and the gNB, channel conditions, a decoding capability, a decoding configuration, and/or the like.

In some aspects, a UE may use message repetition to transmit multiple instances of an uplink communication. That is, the UE may transmit the same uplink communication in each repetition using a configured grant. Downlink activity may be valid for assuming ACK based at least in part on when symbols are counted for the threshold quantity of symbols or when a time duration of a timer starts. For example, downlink activity may be valid if detected the threshold quantity of symbols after any repetition. It is up to the gNB to ensure that the downlink communication is transmitted after the gNB decodes the uplink communication on the PUSCH correctly. In some aspects, downlink activity may be valid if detected the threshold quantity of symbols after a last (4th) repetition. In some aspects, downlink activity may be valid if detected the threshold quantity of symbols after a 1st repetition.

As indicated above, FIG. 8 is provided as an example. Other examples may differ from what is described with regard to FIG. 8.

Figure 9:
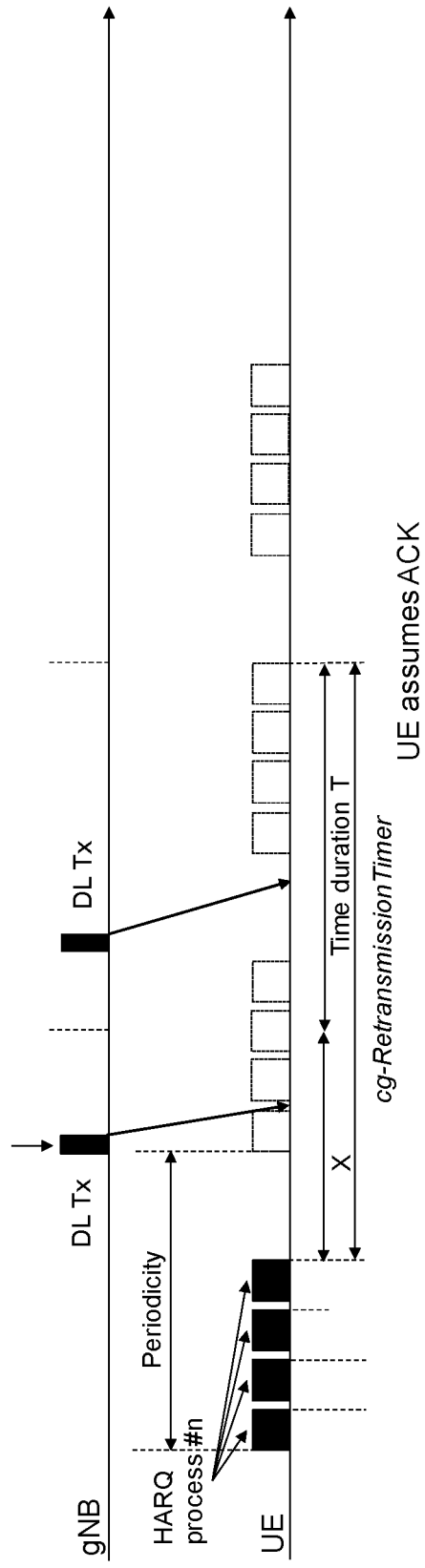
FIG. 9 is a diagram illustrating an example of unified feedback for configured grant for ultra-reliable communication and unlicensed spectrum, in accordance with various aspects of the present disclosure.

FIG. 9 is a diagram illustrating an example 900 of unified feedback for configured grant for ultra-reliable communication and unlicensed spectrum, in accordance with various aspects of the present disclosure.

Example 900 shows a time duration of a timer with a first duration and a second duration, as described in connection with FIG. 7. While multiple repetitions may be used, the UE may not determine downlink activity to be valid for assuming ACK if the downlink transmission is not received during the second duration. The second duration may start based at least in part on which repetition marks a beginning of a minimum delay period (first duration). If the UE detects downlink activity outside of the second duration, the UE may not interpret the downlink activity as ACK.

As indicated above, FIG. 9 is provided as an example. Other examples may differ from what is described with regard to FIG. 9.

Figure 10:
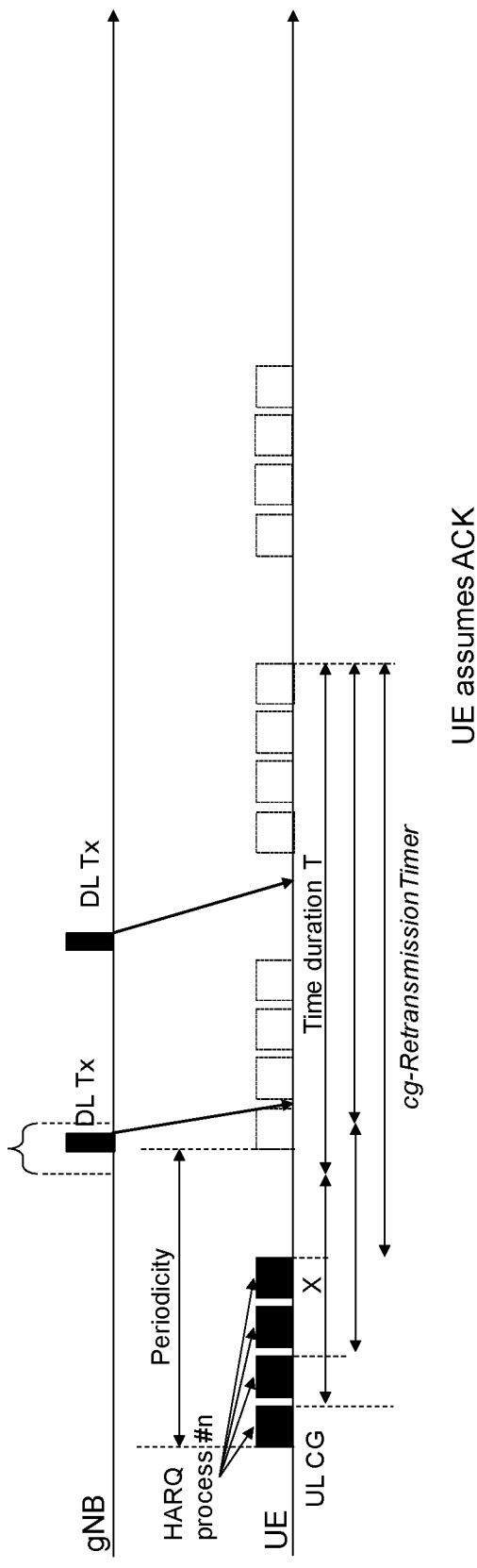
FIG. 10 is a diagram illustrating an example of unified feedback for configured grant for ultra-reliable communication and unlicensed spectrum, in accordance with various aspects of the present disclosure.

FIG. 10 is a diagram illustrating an example 1000 of unified feedback for configured grant for ultra-reliable communication and unlicensed spectrum, in accordance with various aspects of the present disclosure.

Example 1000 shows a time duration of a timer (e.g., cg-RetransmissionTimer) that includes a first duration and a second duration, as described in connection with FIGS. 7 and 9. However, in example 1000, the first duration starts earlier, with respect to an earlier repetition. Accordingly, the second duration for detecting activity may be longer. For example, if the UE detects downlink activity during the second duration, the UE may assume an ACK for the uplink communication.

As indicated above, FIG. 10 is provided as an example. Other examples may differ from what is described with regard to FIG. 10.

Figure 11:
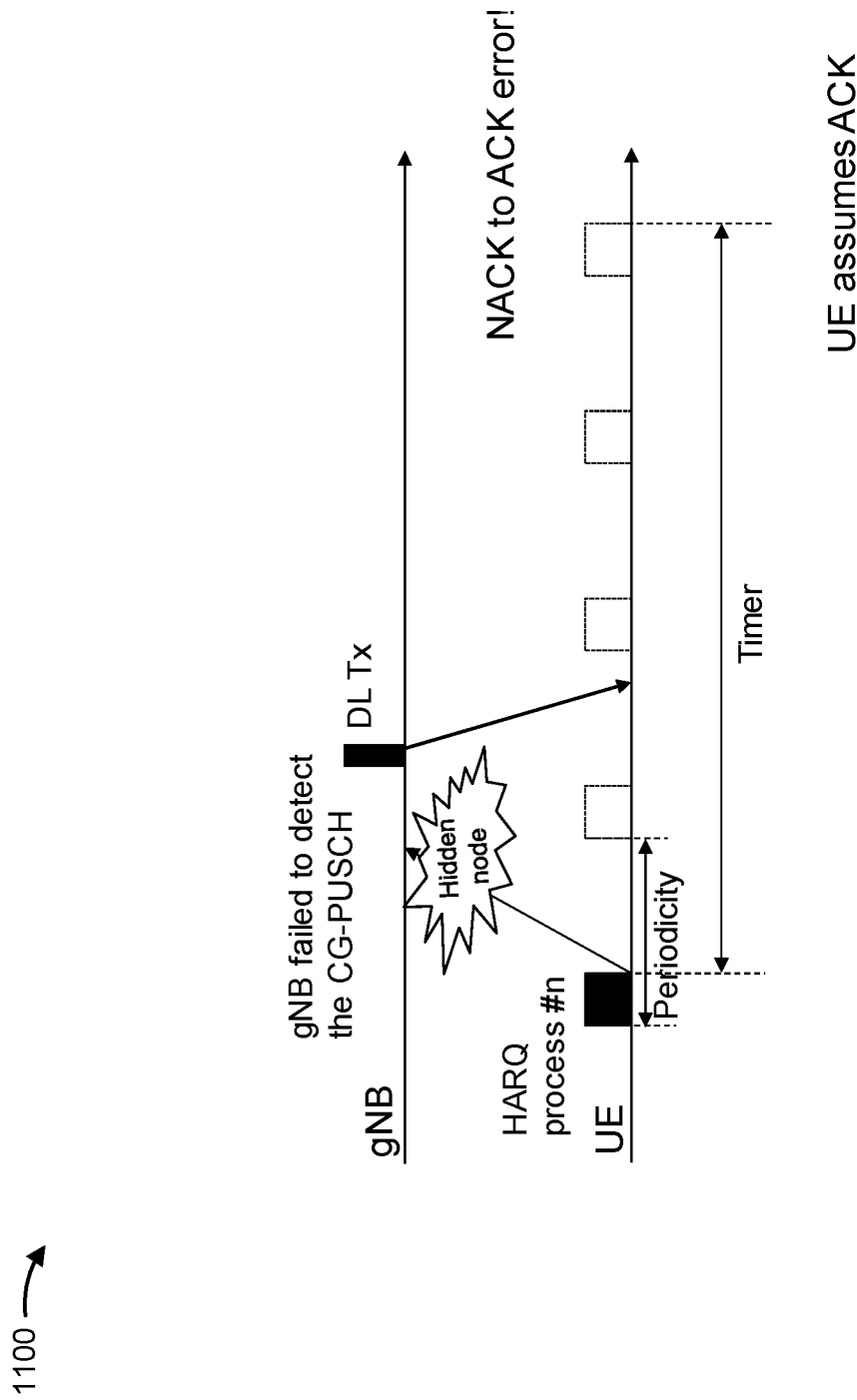
FIG. 11 is a diagram illustrating an example of a hidden node that jams uplink communications, in accordance with various aspects of the present disclosure.

FIG. 11 is a diagram illustrating an example 1100 of a hidden node that jams uplink communications, in accordance with various aspects of the present disclosure.

Example 1100 shows that a gNB may fail to correctly decode an uplink communication that uses a configured grant on a PUSCH (CG-PUSCH). The failure may be attributed to a hidden node that is jamming uplink signals. The hidden node is hidden because the gNB is unaware of the hidden node that is causing interference. The gNB may not be aware of a failed uplink transmission and will thus not know to transmit a NACK or know to which HARQ process to attribute the NACK. Depending on the HARQ procedure that is used, the UE will not receive any DFI (NACK) and will instead receive a downlink communication because the gNB has data to transmit. The UE may thus interpret the downlink communication as an ACK, which is incorrect.

As indicated above, FIG. 11 is provided as an example. Other examples may differ from what is described with regard to FIG. 11.

Figure 12:
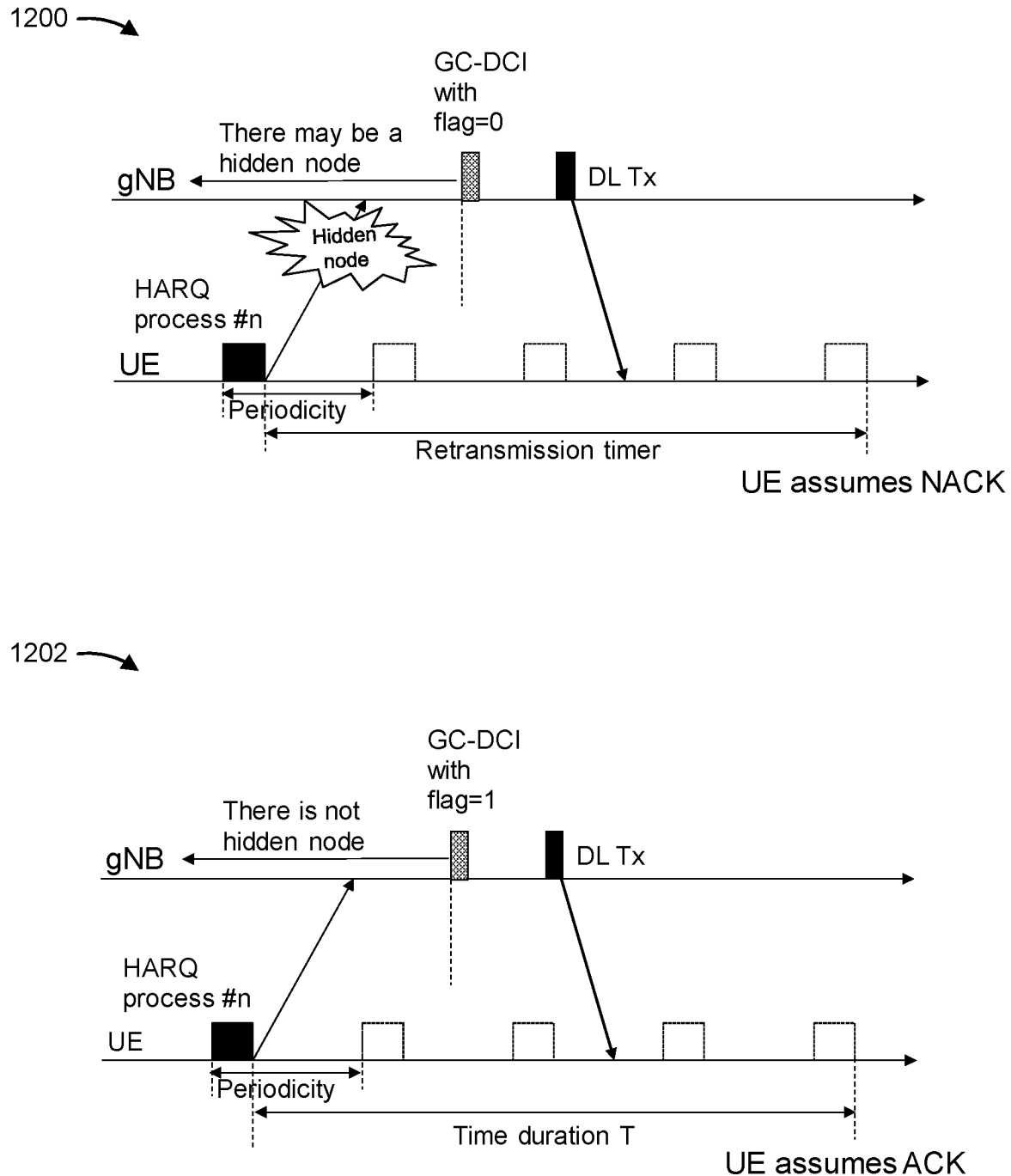
FIG. 12 is a diagram illustrating examples of a flag for unified feedback for configured grant for ultra-reliable communication and unlicensed spectrum, in accordance with various aspects of the present disclosure.

FIG. 12 is a diagram illustrating examples 1200, 1202 of a flag for unified feedback for configured grant for ultra-reliable communication and unlicensed spectrum, in accordance with various aspects of the present disclosure.

In some aspects, a gNB may set an indication (e.g., flag) that indicates whether the UE is to use a legacy HARQ procedure or a certain acknowledgment mode that detects downlink activity during a time duration associated with a timer (e.g., new timer). The gNB may set the flag based at least in part on whether the gNB determines there may be a hidden node. The gNB flag may be in group common DCI (GC-DCI).

Example 1200 shows that the gNB may determine that there may be a hidden node and thus the flag is set to 0, or to not indicate the certain acknowledgment mode. Accordingly, the UE may use a legacy retransmission timer and assume NACK if downlink activity is detected.

Example 1202 shows that the gNB may determine that there is not a hidden node and thus the flag is set to 1, or to indicate the certain acknowledgment mode. Accordingly, the UE may interpret downlink activity (but no DFI) during a time period associated with a timer as an ACK.

As indicated above, FIG. 12 provides examples. Other examples may differ from what is described with regard to FIG. 12.

Figure 13:
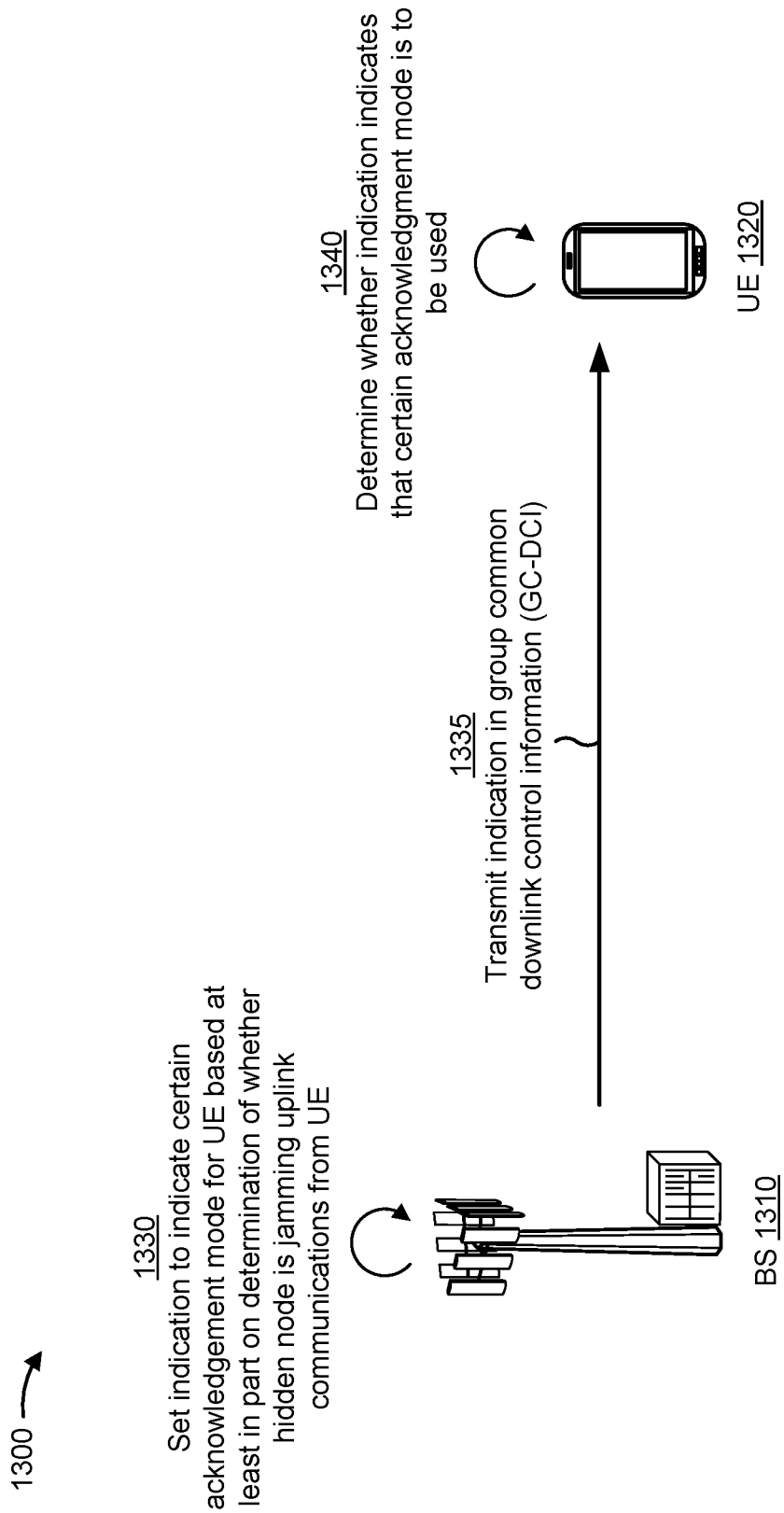
FIG. 13 is a diagram illustrating an example of a flag for unified feedback for configured grant for ultra-reliable communication and unlicensed spectrum, in accordance with various aspects of the present disclosure.

FIG. 13 is a diagram illustrating an example 1300 of setting a flag for unified feedback for configured grant for ultra-reliable communication and unlicensed spectrum, in accordance with various aspects of the present disclosure. As shown in FIG. 13, example 1300 includes communication between BS 1310 (e.g., a BS 110 depicted in FIGS. 1 and 2) and a UE 1320 (e.g., a UE 120 depicted in FIGS. 1 and 2). In some aspects, BS 1310 and UE 1320 may be included in a wireless network, such as wireless network 100. BS 1310 and UE 1320 may communicate on a wireless access link, which may include an uplink and a downlink.

As shown by reference number 1330, BS 1310 may set an indication (e.g., flag) to indicate a certain acknowledgement mode based at least in part on a determination that there is a hidden node jamming uplink communications from UE 1320. The flag may be a bit in GC-DCI that is set to 0 if there is a hidden node jamming uplink communications, or set to 1 if there is not a hidden node jamming uplink communications. That is, the gNB is able to receive uplink communications according to a configured grant. As shown by reference number 1335, BS 1310 may transmit the indication to UE 1320.

As shown by reference number 1340, UE 1320 may use a legacy acknowledgement mode (as used with NR-U) or a certain, newer acknowledgment mode that detects downlink activity during a time duration to determine if an uplink communication is acknowledged or not. The time duration for the certain acknowledgment mode may start after the uplink communication is transmitted. The time duration may have a first (minimum delay) duration and a second (valid detection) period. The UE may determine whether the uplink communication is acknowledged or not by the gNB with downlink activity (but no DFI) based at least in part on an acknowledgement mode indicated by the flag. In some aspects, if no GC-DCI is received, the UE may assume a default value of 0 for the flag.

As indicated above, FIG. 13 is provided as an example. Other examples may differ from what is described with regard to FIG. 13.

Figure 14:
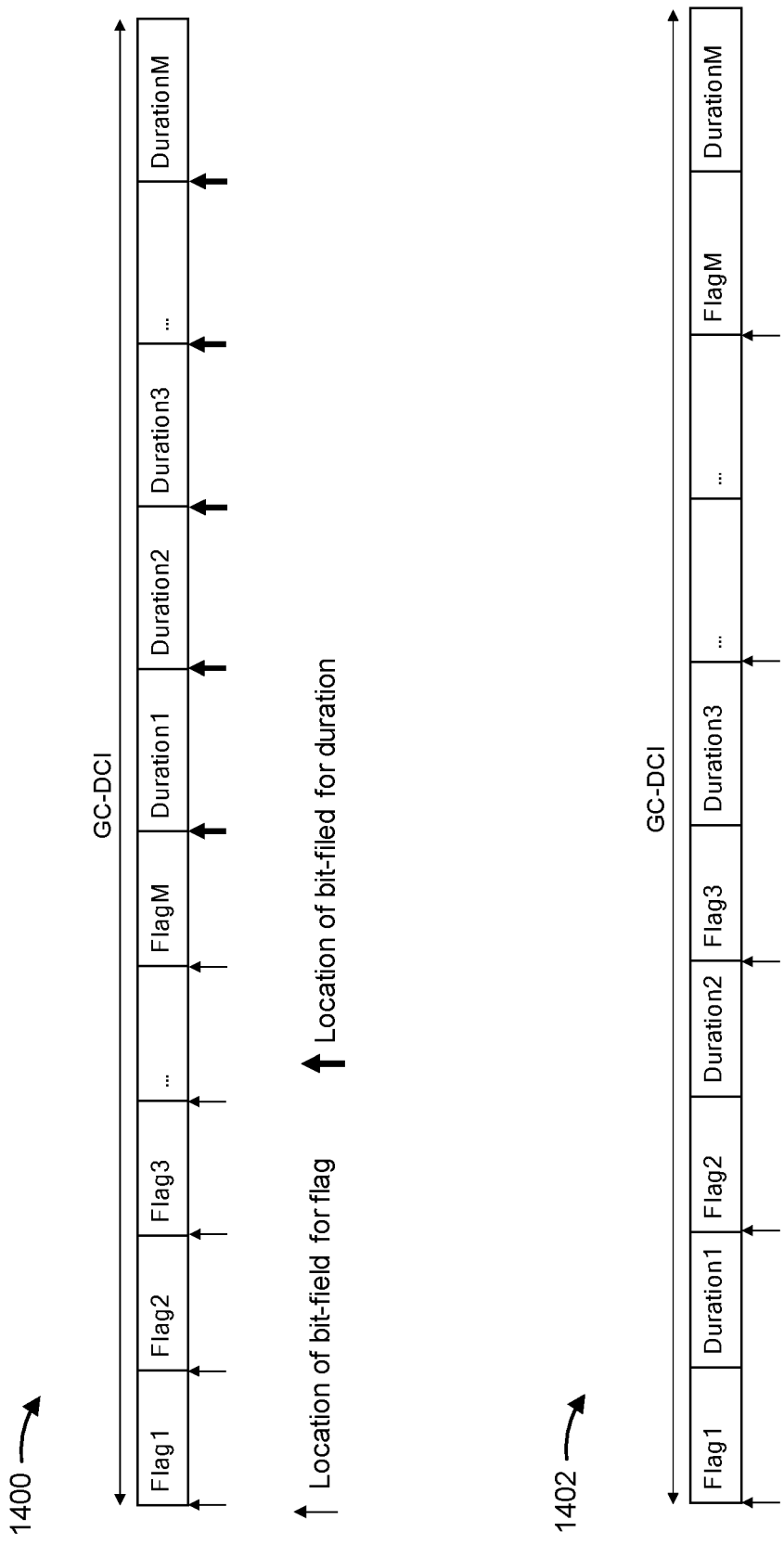
FIG. 14 is a diagram illustrating examples of a flag for unified feedback for configured grant for ultra-reliable communication and unlicensed spectrum, in accordance with various aspects of the present disclosure.

FIG. 14 is a diagram illustrating examples 1400, 1402 of a flag for unified feedback for configured grant for ultra-reliable communication and unlicensed spectrum, in accordance with various aspects of the present disclosure.

Example 1400 shows an example of locations for a bit field for one or more flags. The locations may be preconfigured or dynamically configured by a gNB. Each flag may have an effective duration that is indicated in the GC-DCI (preconfigured location or dynamically configured location). The duration may indicate an index that corresponds to a duration (e.g., symbols with reference to a subcarrier spacing) from among multiple durations. Example 1400 shows an example of locations for durations that correspond to flags. Example 1402 shows another configuration of a GC-DCI, where duration indices are located with corresponding flags.

As indicated above, FIG. 14 is provided as an example. Other examples may differ from what is described with regard to FIG. 14.

Figure 15:
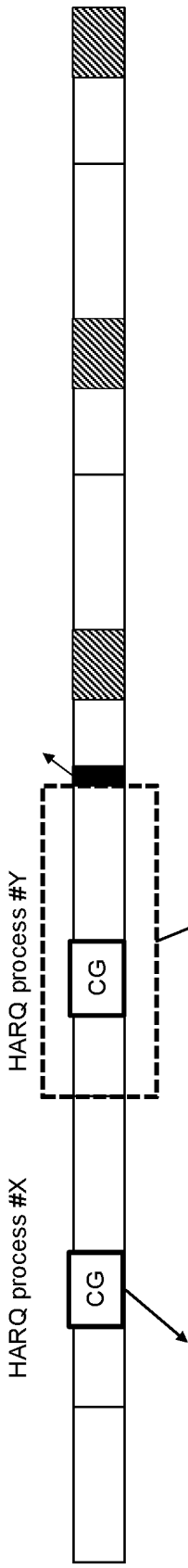
FIG. 15 is a diagram illustrating an example of flag durations for unified feedback for configured grant for ultra-reliable communication and unlicensed spectrum, in accordance with various aspects of the present disclosure.

FIG. 15 is a diagram illustrating an example 1500 of flag durations for unified feedback for configured grant for ultra-reliable communication and unlicensed spectrum, in accordance with various aspects of the present disclosure.

Example 1500 shows an example of duration indices that correspond to a quantity of symbols for how long a flag is to last. For example, an index of 0 indicates a duration of 14 symbols, and an index of 1 indicates a doubling of the symbols to 28. In example 1500, a flag set to 1 and a duration index of 1 in the GC-DCI indicates to a UE that the UE is to use a certain (new) acknowledgement mode for a configured grant that is transmitted within 28 symbols before the first symbol of GC-DCI. HARQ process #Y in example 1500 is transmitted within 28 symbols before the first symbol of GC-DCI, and thus the UE may use the new acknowledgement mode for HARQ process #Y. HARQ process #X in example 1500 is transmitted outside the 28 symbols before the first symbol of GC-DCI, and thus the UE may use a legacy acknowledgement mode for HARQ process #X.

As indicated above, FIG. 15 is provided as an example. Other examples may differ from what is described with regard to FIG. 15.

FIG. 16 is a diagram illustrating an example process 1600 performed, for example, by a UE, in accordance with various aspects of the present disclosure. Example process 1600 is an example where the UE (e.g., a UE 120 depicted in FIGS. 1-2, UE 620 depicted in FIG. 6, UE 1320 depicted in FIG. 13, the UE depicted in FIGS. 5, 7-10, and 12, and/or the like) performs operations associated with unified feedback for configured grant for ultra-reliable communication and unlicensed spectrum.

As shown in FIG. 16, in some aspects, process 1600 may include starting a timer after transmitting an uplink communication on a physical uplink shared channel to a base station using a configured grant (block 1610). For example, the UE (e.g., using antenna 252, demodulator 254, MIMO detector 256, receive processor 258, transmit processor 264, TX MIMO processor 266, modulator 254, controller/processor 280, and/or memory 282) may start a timer after transmitting an uplink communication on a physical uplink shared channel to a base station using a configured grant, as described above.

As further shown in FIG. 16, in some aspects, process 1600 may include determining whether the uplink communication is acknowledged as received by the base station based at least in part on determining whether a downlink communication from the base station is detected within a time duration associated with the timer (block 1620). For example, the UE (e.g., using antenna 252, demodulator 254, MIMO detector 256, receive processor 258, transmit processor 264, TX MIMO processor 266, modulator 254, controller/processor 280, and/or memory 282) may determine whether the uplink communication is acknowledged as received by the base station based at least in part on determining whether a downlink communication from the base station is detected within a time duration associated with the timer, as described above.

Process 1600 may include additional aspects, such as any single aspect or any combination of aspects described below and/or in connection with one or more other processes described elsewhere herein.

In a first aspect, determining whether the uplink communication is acknowledged includes determining that the uplink communication is acknowledged based at least in part on determining that downlink feedback information is not received from the base station within the time duration associated with the timer and a downlink communication from the base station is detected within the time duration associated with the timer.

In a second aspect, alone or in combination with the first aspect, determining whether the uplink communication is acknowledged includes determining that the uplink communication is negative acknowledged by the base station based at least in part on determining that downlink feedback information is not received from the base station within the time duration associated with the timer and a downlink communication from the base station is not detected within the time duration associated with the timer.

In a third aspect, alone or in combination with one or more of the first and second aspects, the timer is a configured grant retransmission timer.

In a fourth aspect, alone or in combination with one or more of the first through third aspects, the time duration associated with the timer includes a first duration part and a second duration part that follows the first duration part, and determining whether the uplink communication is acknowledged includes determining that the uplink communication is acknowledged based at least in part on determining that a downlink communication from the base station is detected during the second duration part.

In a fifth aspect, alone or in combination with one or more of the first through fourth aspects, a time duration of the first duration part corresponds to a time duration of a minimum downlink feedback information delay timer.

In a sixth aspect, alone or in combination with one or more of the first through fifth aspects, determining that the downlink communication from the base station is detected during the second duration part includes determining that a first symbol of the downlink communication is received a threshold quantity of symbols after a last symbol of the uplink communication is transmitted.

In a seventh aspect, alone or in combination with one or more of the first through sixth aspects, the uplink communication includes multiple repetitions of the uplink communication, and determining that the downlink communication from the base station is detected during the second duration part includes determining that a first symbol of the downlink communication is received a threshold quantity of symbols after a last symbol of any of the multiple repetitions of the uplink communication is transmitted.

In an eighth aspect, alone or in combination with one or more of the first through seventh aspects, the uplink communication includes multiple repetitions of the uplink communication, and determining that the downlink communication from the base station is detected during the second duration part includes determining that a first symbol of the downlink communication is received a threshold quantity of symbols after a last symbol of a last repetition of the multiple repetitions of the uplink communication is transmitted.

In a ninth aspect, alone or in combination with one or more of the first through eighth aspects, the uplink communication includes multiple repetitions of the uplink communication, and determining that the downlink communication from the base station is detected during the second duration part includes determining that a first symbol of the downlink communication is received a threshold quantity of symbols after a last symbol of a first repetition of the multiple repetitions of the uplink communication is transmitted.

In a tenth aspect, alone or in combination with one or more of the first through ninth aspects, the time duration of the timer includes a first duration part and a second duration part that follows the first duration part, and determining whether the uplink communication is acknowledged includes determining that the uplink communication is negative acknowledged based at least in part on determining that a downlink communication from the base station is not detected during the second duration part.

In an eleventh aspect, alone or in combination with one or more of the first through tenth aspects, determining whether the uplink communication is acknowledged includes determining whether the uplink communication is acknowledged based at least in part on determining that an indication, received from the base station in DCI within the time duration associated with the timer, indicates that a certain acknowledgment mode for the UE is to be used, where the UE, in the certain acknowledgement mode, determines whether the uplink communication is acknowledged as received by the base station based at least in part on determining whether a downlink communication from the base station is detected within a time duration associated with the timer.

In a twelfth aspect, alone or in combination with one or more of the first through eleventh aspects, the indication is a flag in GC-DCI, and determining that the indication indicates a certain acknowledgement mode includes identifying the flag in a configured location of the GC-DCI.

In a thirteenth aspect, alone or in combination with one or more of the first through twelfth aspects, a field in another configured location of the GC-DCI indicates a duration of how long the flag is in effect, and process 1600 includes the UE operating in the certain acknowledgement mode based at least in part on how long the flag is in effect.

In a fourteenth aspect, alone or in combination with one or more of the first through thirteenth aspects, the uplink communication is associated with a HARQ process.

In a fifteenth aspect, alone or in combination with one or more of the first through fourteenth aspects, the configured grant is associated with URLLC.

In a sixteenth aspect, alone or in combination with one or more of the first through fifteenth aspects, the configured grant is associated with NR-U.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

FIG. 17 is a diagram illustrating an example process 1700 performed, for example, by a base station, in accordance with various aspects of the present disclosure. Example process 1700 is an example where the base station (e.g., base station 110 depicted in FIGS. 1-2, BS 610 depicted in FIG. 6, BS 1310 depicted in FIG. 13, the gNB depicted in FIGS. 5, 7-10, and 12, and/or the like) performs operations associated with unified feedback for configured grant for ultra-reliable communication and unlicensed spectrum.

As shown in FIG. 17, in some aspects, process 1700 may include setting, based at least in part on a determination of whether a hidden node is jamming uplink communications from a UE, an indication to indicate a certain acknowledgement mode for the UE (block 1710). For example, the base station (e.g., using transmit processor 220, TX MIMO processor 230, modulator 232, antenna 234, demodulator 232, MIMO detector 236, receive processor 238, controller/processor 240, memory 242, and/or scheduler 246) may set, based at least in part on a determination of whether a hidden node is jamming uplink communications from a UE, an indication to indicate a certain acknowledgement mode for the UE, as described above. In some aspects, the UE in the certain acknowledgement mode determines whether an uplink communication on a PUSCH using a configured grant is acknowledged by the base station based at least in part on a determination that downlink feedback information is not received from the base station within a time duration associated with a timer and a downlink communication from the base station is detected within the time duration associated with the timer.

As further shown in FIG. 17, in some aspects, process 1700 may include transmitting the indication to the UE before transmitting a downlink communication to the UE (block 1720). For example, the base station (e.g., using transmit processor 220, TX MIMO processor 230, modulator 232, antenna 234, controller/processor 240, memory 242, and/or scheduler 246) may transmit the indication to the UE before transmitting a downlink communication to the UE, as described above.

Process 1700 may include additional aspects, such as any single aspect or any combination of aspects described below and/or in connection with one or more other processes described elsewhere herein.

In a first aspect, setting the indication includes setting the indication to indicate the certain acknowledgement mode based at least in part on a determination that a hidden node is jamming uplink communications from the UE.

In a second aspect, alone or in combination with the first aspect, setting the indication includes setting the indication to not indicate the certain acknowledgement mode based at least in part on a determination that no hidden node is jamming uplink communications from the UE.

In a third aspect, alone or in combination with one or more of the first and second aspects, process 1700 includes transmitting the downlink communication to the UE after transmitting the indication.

In a fourth aspect, alone or in combination with one or more of the first through third aspects, the indication is a flag in GC-DCI, and process 1700 includes setting the flag in a configured location of the GC-DCI.

In a fifth aspect, alone or in combination with one or more of the first through fourth aspects, a field in the GC-DCI indicates a duration of how long the flag is in effect, and process 1700 includes setting the field in another configured location of the GC-DCI.

In a sixth aspect, alone or in combination with one or more of the first through fifth aspects, the configured grant is associated with URLLC.

In a seventh aspect, alone or in combination with one or more of the first through sixth aspects, the configured grant is associated with NR-U.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    starting a timer after transmitting an uplink communication on a physical uplink shared channel to a base station using a configured grant; and
    determining whether the uplink communication is acknowledged as received by the base station based at least in part on determining whether a downlink communication from the base station is received within a time duration associated with the timer.

2. The method of claim 1, wherein determining whether the uplink communication is acknowledged includes determining that the uplink communication is acknowledged based at least in part on determining that downlink feedback information is not received from the base station within the time duration associated with the timer and a downlink communication from the base station is received within the time duration associated with the timer.

3. The method of claim 1, wherein determining whether the uplink communication is acknowledged includes determining that the uplink communication is negative acknowledged by the base station based at least in part on determining that downlink feedback information is not received from the base station within the time duration associated with the timer and a downlink communication from the base station is not received within the time duration associated with the timer.

4. The method of claim 1, wherein the timer is a configured grant retransmission timer.

5. The method of claim 1, wherein the time duration associated with the timer includes a first duration part and a second duration part that follows the first duration part, and wherein determining whether the uplink communication is acknowledged includes determining that the uplink communication is acknowledged based at least in part on determining that a downlink communication from the base station is received during the second duration part.

6. The method of claim 5, wherein a time duration of the first duration part corresponds to a time duration of a minimum downlink feedback information delay timer.

7. The method of claim 5, wherein determining that the downlink communication from the base station is received during the second duration part includes determining that a first symbol of the downlink communication is received a threshold quantity of symbols after a last symbol of the uplink communication is transmitted.

8. The method of claim 5, wherein the uplink communication includes multiple repetitions of the uplink communication, and wherein determining that the downlink communication from the base station is received during the second duration part includes determining that a first symbol of the downlink communication is received a threshold quantity of symbols after a last symbol of any of the multiple repetitions of the uplink communication is transmitted.

9. The method of claim 5, wherein the uplink communication includes multiple repetitions of the uplink communication, and wherein determining that the downlink communication from the base station is received during the second duration part includes determining that a first symbol of the downlink communication is received a threshold quantity of symbols after a last symbol of a last repetition of the multiple repetitions of the uplink communication is transmitted.

10. The method of claim 5, wherein the uplink communication includes multiple repetitions of the uplink communication, and wherein determining that the downlink communication from the base station is received during the second duration part includes determining that a first symbol of the downlink communication is received a threshold quantity of symbols after a last symbol of a first repetition of the multiple repetitions of the uplink communication is transmitted.

11. The method of claim 1, wherein the time duration of the timer includes a first duration part and a second duration part that follows the first duration part, and wherein determining whether the uplink communication is acknowledged includes determining that the uplink communication is negative acknowledged based at least in part on determining that a downlink communication from the base station is not received during the second duration part.

12. The method of claim 1, wherein determining whether the uplink communication is acknowledged includes determining whether the uplink communication is acknowledged based at least in part on determining that an indication, received from the base station in downlink control information (DCI) within the time duration associated with the timer, indicates that a certain acknowledgment mode for the UE is to be used, wherein the UE, in the certain acknowledgement mode, determines whether the uplink communication is acknowledged as received by the base station based at least in part on determining whether a downlink communication from the base station is received within a time duration associated with the timer.

13. The method of claim 12, wherein the indication is a flag in group common DCI (GC-DCI), and wherein determining that the indication indicates a certain acknowledgement mode includes identifying the flag in a configured location of the GC-DCI.

14. The method of claim 13, wherein a field in another configured location of the GC-DCI indicates a duration of how long the flag is in effect, and wherein the method includes the UE operating in the certain acknowledgement mode based at least in part on how long the flag is in effect.

15. The method of claim 1, wherein the uplink communication is associated with a hybrid automatic repeat request process.

16. The method of claim 1, wherein the configured grant is associated with ultra-reliable low-latency communication.

17. The method of claim 1, wherein the configured grant is associated with new radio for unlicensed spectrum.

18. A user equipment (UE) for wireless communication, comprising:
a memory; and
one or more processors operatively coupled to the memory, the memory and the one or more processors configured to:
start a timer after transmitting an uplink communication on a physical uplink shared channel to a base station using a configured grant; and
determine whether the uplink communication is acknowledged as received by the base station based at least in part on determining whether a downlink communication from the base station is received within a time duration associated with the timer.

19. The UE of claim 18, wherein the one or more processors, when determining whether the uplink communication is acknowledged, are configured to determine that the uplink communication is acknowledged based at least in part on a determination that downlink feedback information is not received from the base station within the time duration associated with the timer and a downlink communication from the base station is received within the time duration associated with the timer.

20. The UE of claim 18, wherein the one or more processors, when determining whether the uplink communication is acknowledged, are configured to determine that the uplink communication is negative acknowledged by the base station based at least in part on a determination that downlink feedback information is not received from the base station within the time duration associated with the timer and a downlink communication from the base station is not received within the time duration associated with the timer.

21. The UE of claim 18, wherein the one or more processors, when determining whether the uplink communication is acknowledged, are configured to determine whether the uplink communication is acknowledged based at least in part on a determination that an indication, received from the base station in downlink control information (DCI) within the time duration associated with the timer, indicates that a certain acknowledgment mode for the UE is to be used, and wherein the one or more processors, when the UE is in the certain acknowledgement mode, are configured to determine whether the uplink communication is acknowledged as received by the base station based at least in part on a determination of whether a downlink communication from the base station is received within a time duration associated with the timer.

22. The UE of claim 21, wherein the indication is a flag in group common DCI (GC-DCI), and wherein determining that the indication indicates a certain acknowledgement mode includes identifying the flag in a configured location of the GC-DCI.

23. The UE of claim 22, wherein a field in another configured location of the GC-DCI indicates a duration of how long the flag is in effect, and wherein the UE operates in the certain acknowledgement mode based at least in part on how long the flag is in effect.

24. The UE of claim 18, wherein the timer is a configured grant retransmission timer.

25. The UE of claim 18, wherein the time duration associated with the timer includes a first duration part and a second duration part that follows the first duration part, and wherein the one or more processors, when determining whether the uplink communication is acknowledged are configured to determine that the uplink communication is acknowledged based at least in part on determining that a downlink communication from the base station is received during the second duration part.

26. The UE of claim 25, wherein a time duration of the first duration part corresponds to a time duration of a minimum downlink feedback information delay timer.

27. The UE of claim 25, wherein the one or more processors, when determining that the downlink communication from the base station is received during the second duration part, are configured to determine that a first symbol of the downlink communication is received a threshold quantity of symbols after a last symbol of the uplink communication is transmitted.

28. A non-transitory computer-readable medium storing one or more instructions for wireless communication, the one or more instructions, when executed by one or more processors of a user equipment (UE), cause the UE to:
start a timer after transmitting an uplink communication on a physical uplink shared channel to a base station using a configured grant; and
determine whether the uplink communication is acknowledged as received by the base station based at least in part on determining whether a downlink communication from the base station is received within a time duration associated with the timer.

29. An apparatus for wireless communication, comprising:
means for starting a timer after transmitting an uplink communication on a physical uplink shared channel to a base station using a configured grant; and
means for determining whether the uplink communication is acknowledged as received by the base station based at least in part on determining whether a downlink communication from the base station is received within a time duration associated with the timer.

* * * * *